Aug. 21, 1923.
S. G. GOSS
1,465,638
METHOD OF AND APPARATUS FOR MANUFACTURING AND PRINTING TOY BLOCKS
Filed Feb. 14, 1920    9 Sheets-Sheet 1
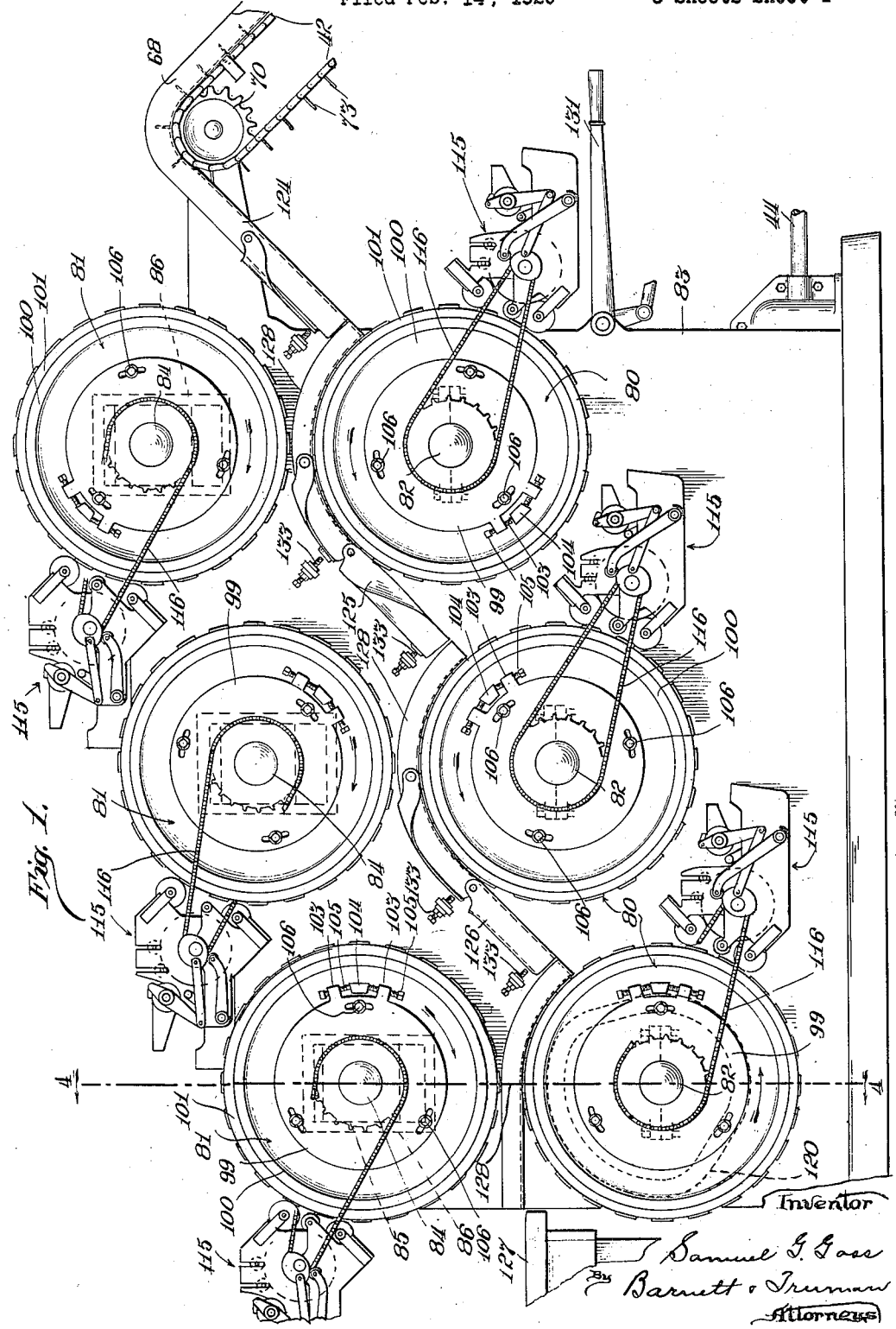
Fig. 1.

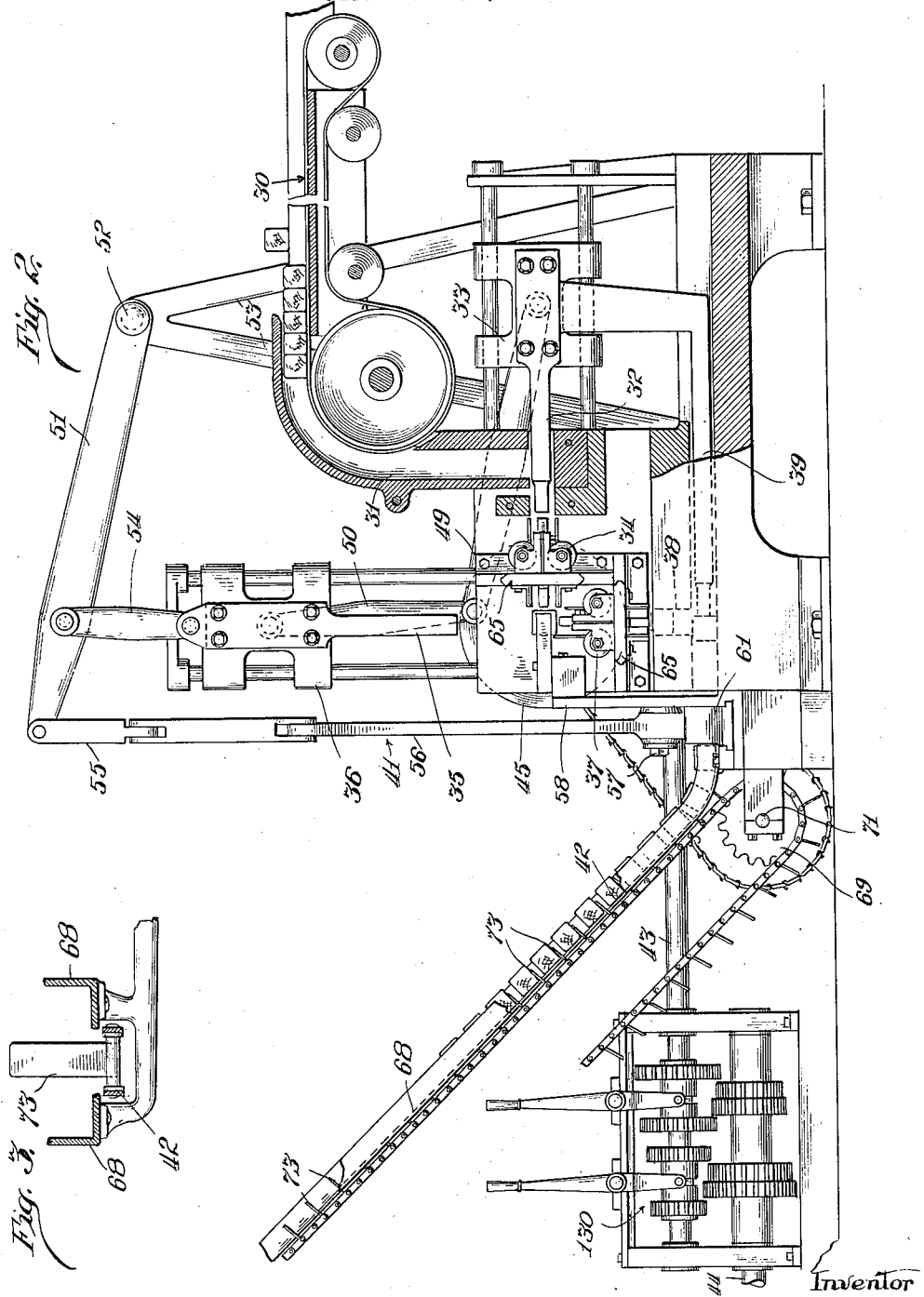

Aug. 21, 1923. 1,465,638
S. G. GOSS
METHOD OF AND APPARATUS FOR MANUFACTURING AND PRINTING TOY BLOCKS
Filed Feb. 14, 1920 9 Sheets-Sheet 3
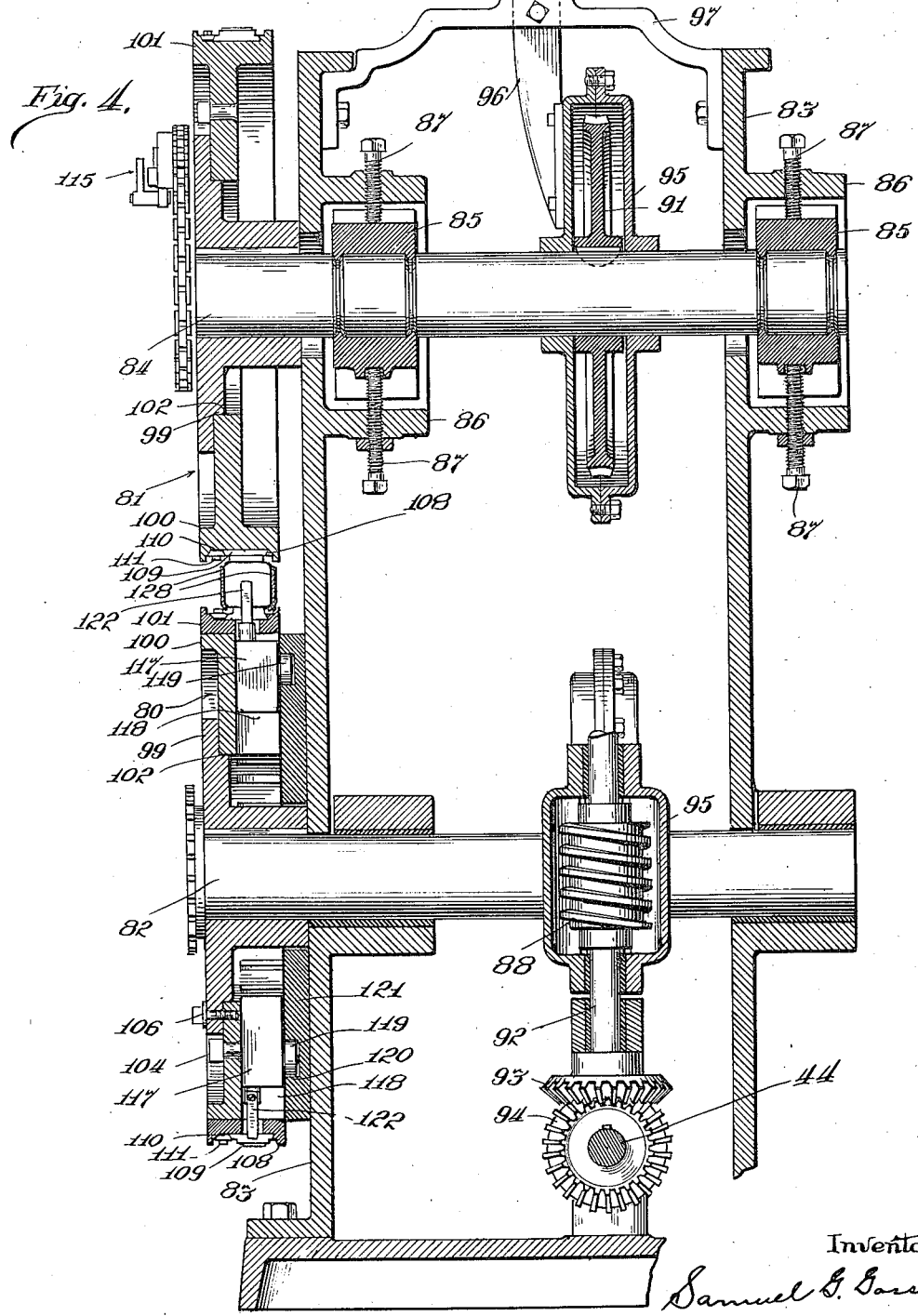
Inventor
Samuel G. Goss
By Barnett & Truman
Attorneys.

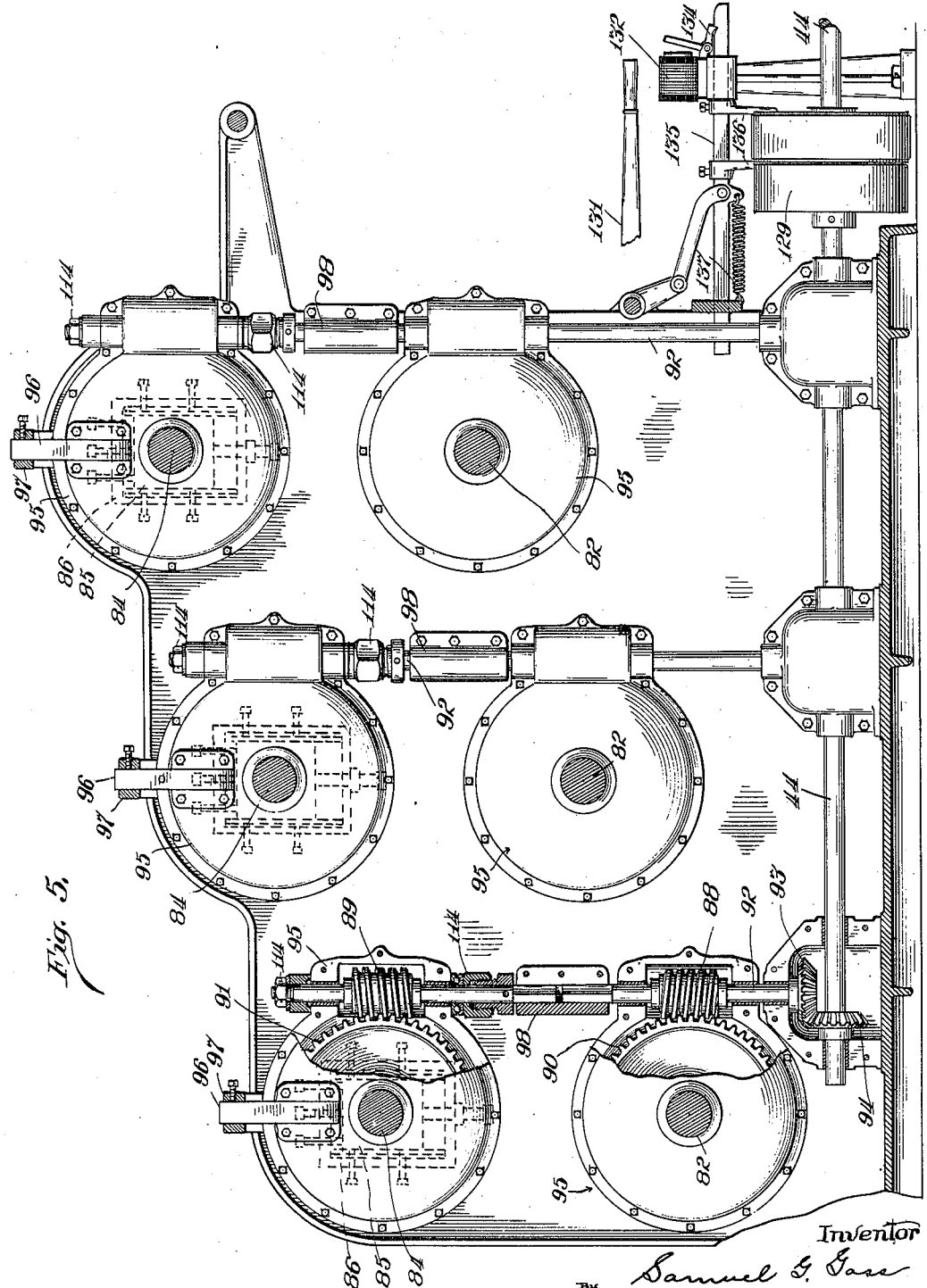

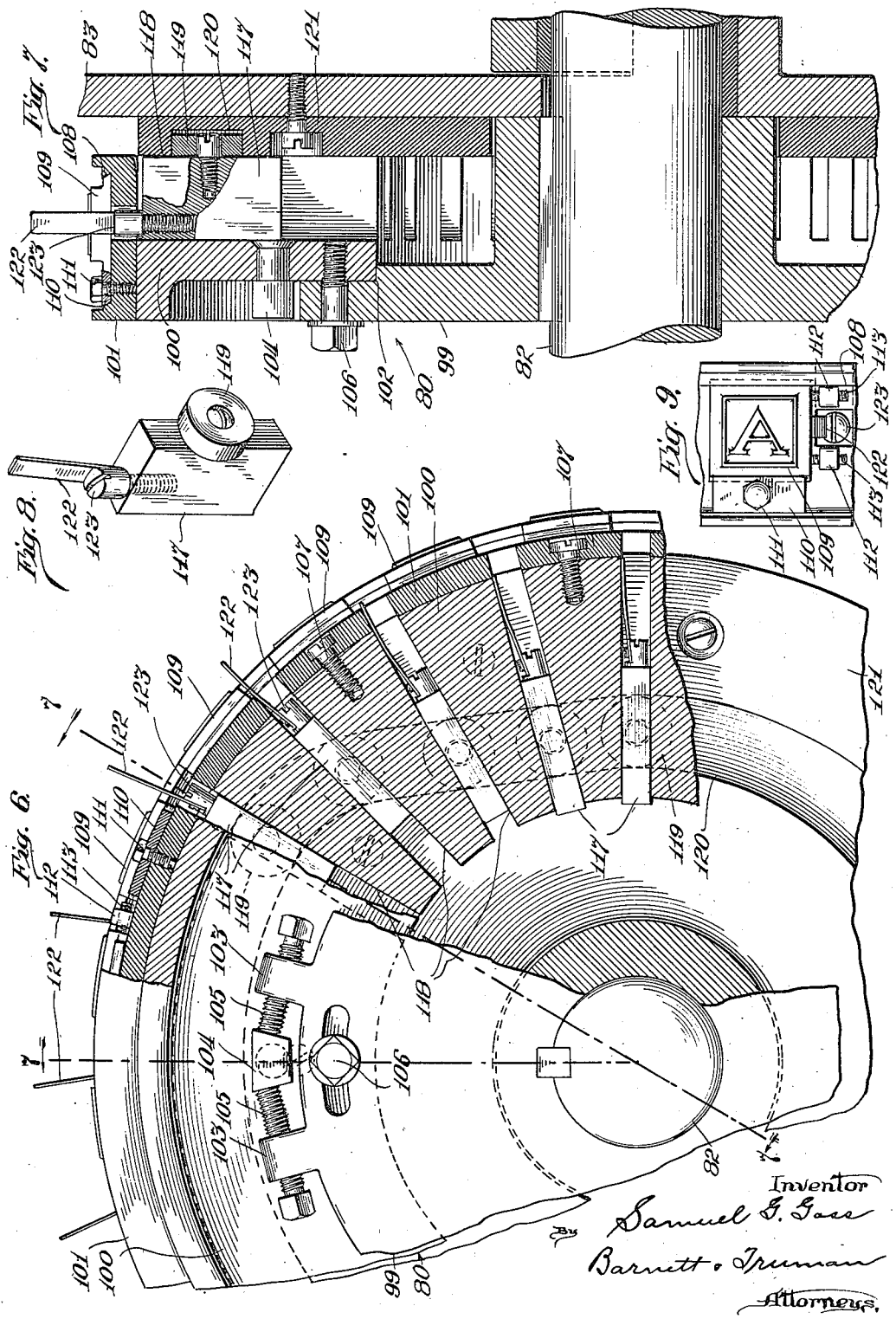

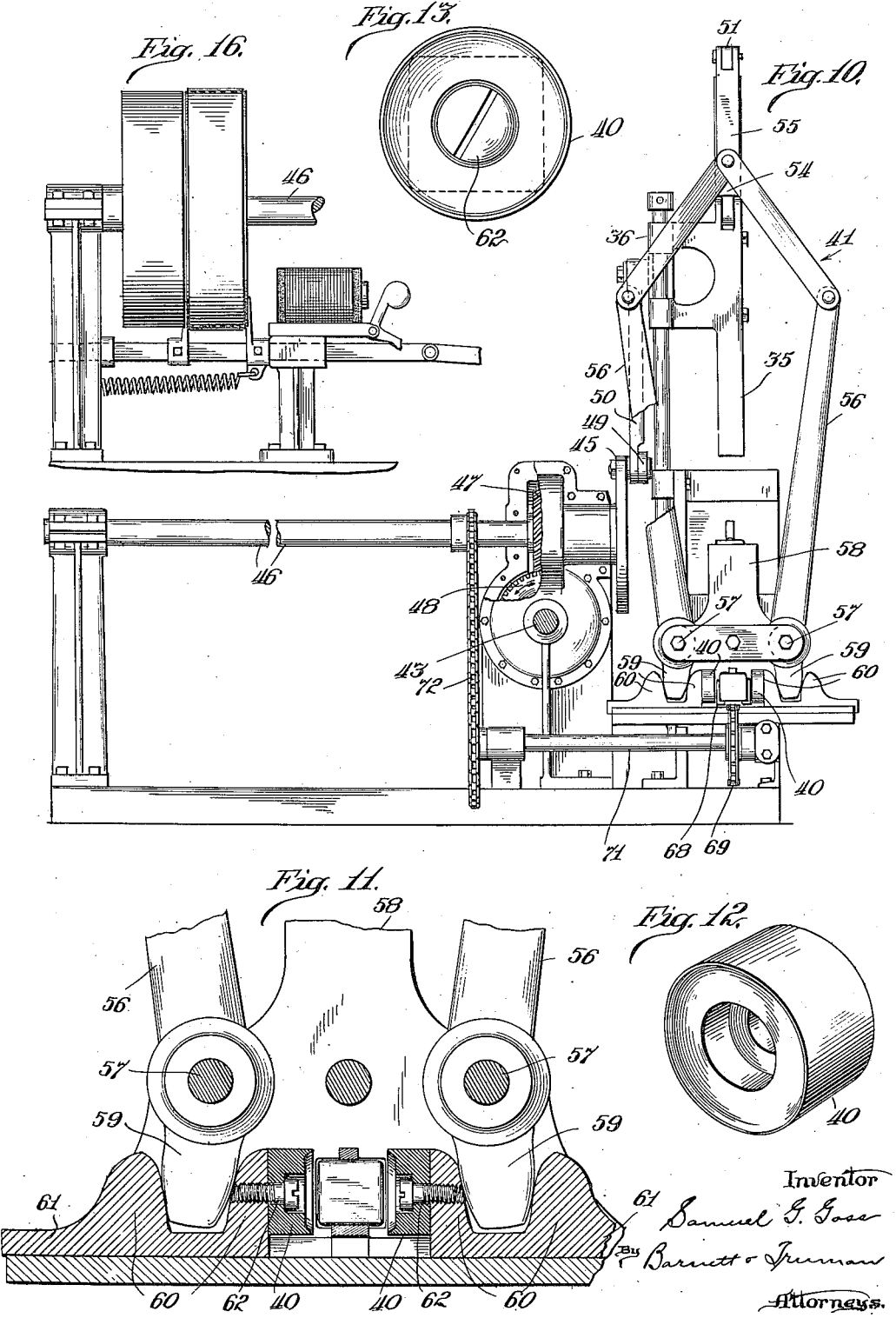

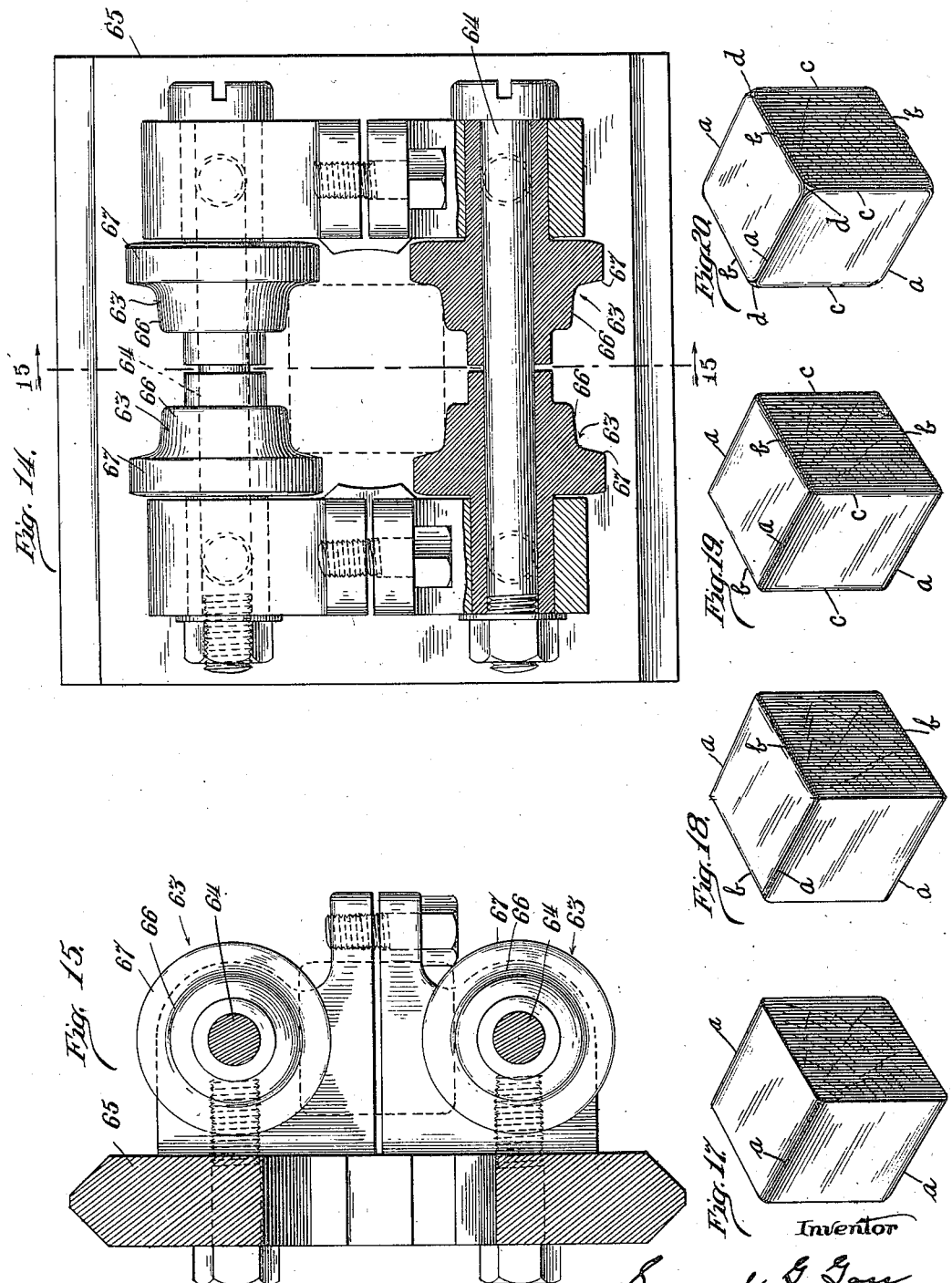

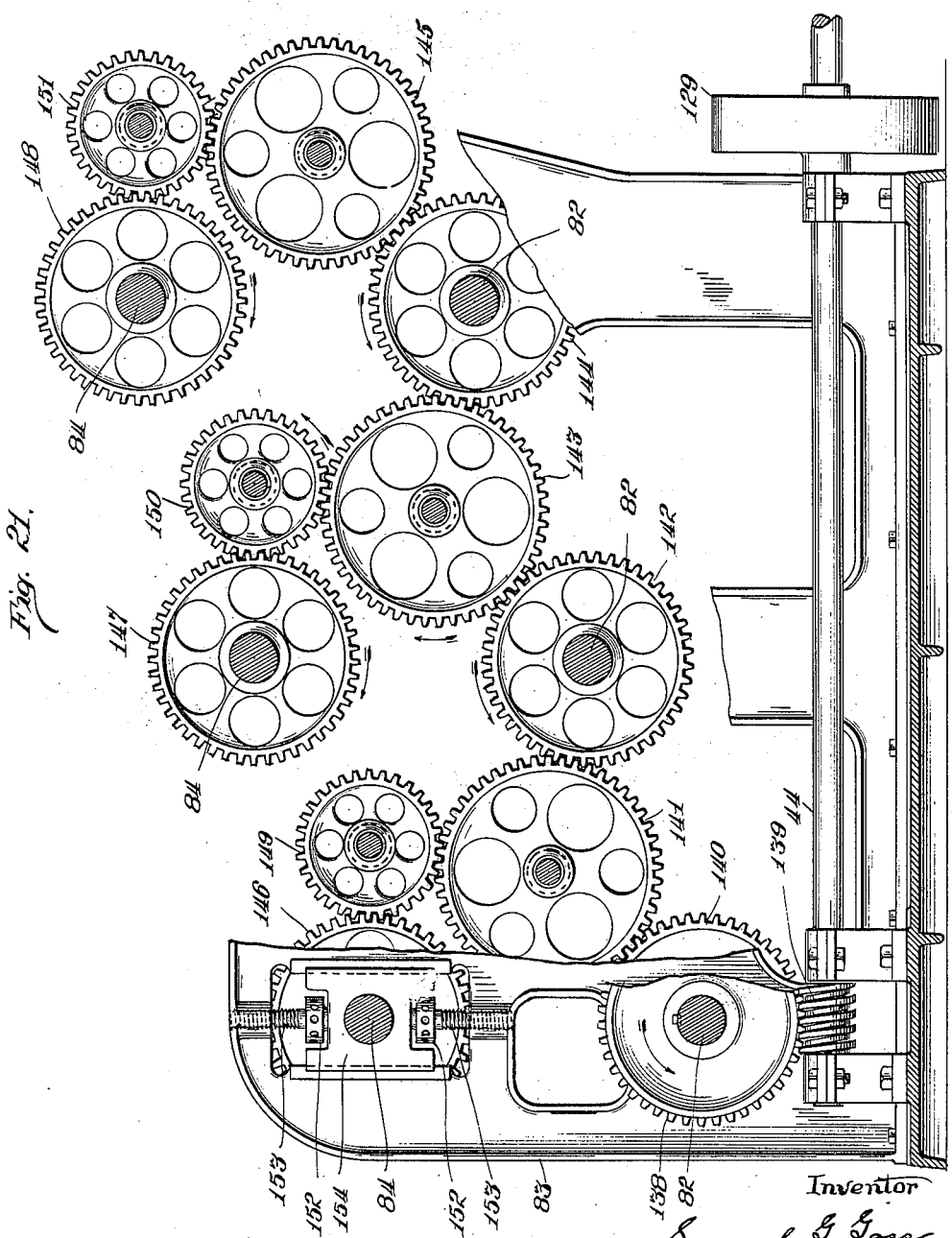

Aug. 21, 1923.
S. G. GOSS
1,465,638
METHOD OF AND APPARATUS FOR MANUFACTURING AND PRINTING TOY BLOCKS
Filed Feb. 14, 1920   9 Sheets-Sheet 9
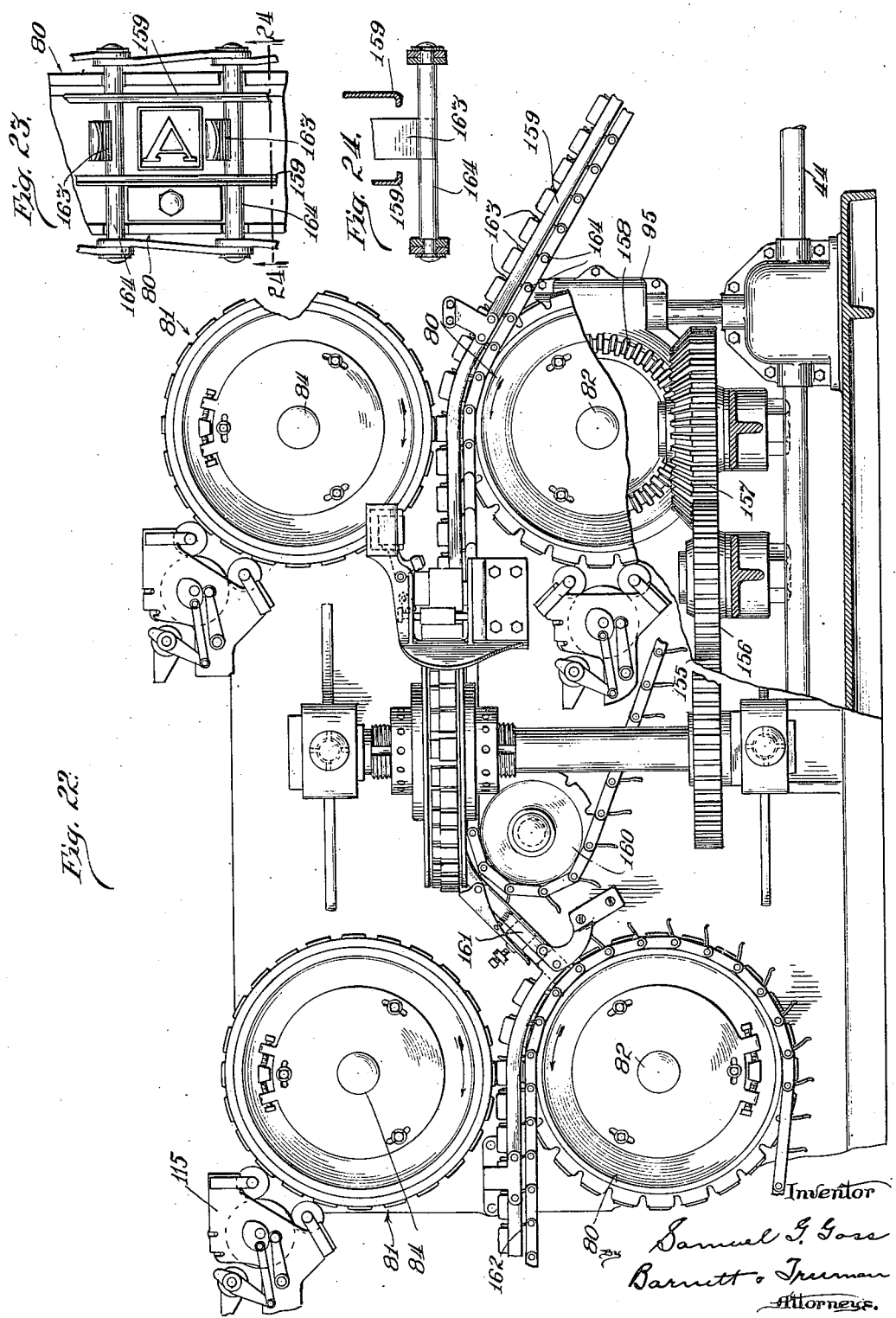

Patented Aug. 21, 1923.

1,465,638

UNITED STATES PATENT OFFICE.

SAMUEL G. GOSS, OF GLENCOE, ILLINOIS; CENTRAL TRUST COMPANY OF ILLINOIS, EXECUTORS OF SAID SAMUEL G. GOSS, DECEASED, ASSIGNOR TO HALSAM PRODUCTS COMPANY, OF CHICAGO, ILLINOIS, A CORPORATION OF ILLINOIS.

METHOD OF AND APPARATUS FOR MANUFACTURING AND PRINTING TOY BLOCKS.

Application filed February 14, 1920. Serial No. 358,623.

*To all whom it may concern:*

Be it known that I, SAMUEL G. GOSS, a citizen of the United States, residing at Glencoe, in the county of Cook and State of Illinois, have invented certain new and useful Improvements in Methods of and Apparatus for Manufacturing and Printing Toy Blocks, of which the following is a specification.

My invention relates to method of and apparatus for manufacturing and printing toy blocks, and more particularly to blocks having their corners and edges rounded, children often being injured by playing with the ordinary blocks having sharp square edges and corners. The invention contemplates manufacturing and printing wood blocks of prismatic shape, for example of the shape of a cube. The wood in the rough is first put through certain preliminary sawing and planing operations, whereby a strip having its four straight grained or longitudinal edges rounded is obtained, the strips being substantially square in cross section except for the rounded edges, if cubical blocks are to be made. These strips are then sent to a gang saw and cut into blocks. The fuzz due to the sawing operation is then removed, which may be done in several ways, for example, by tumbling the blocks for a few minutes in a revolving container.

One of the objects of the invention is to provide a novel method of manufacturing and printing the blocks after they have been passed through the preliminary operations mentioned, which preferably consists in passing the blocks successively between several sets of suitable rollers, whereby the eight cross-grained or transverse sharp square edges are eliminated by rolling and compressing the edges, conveying the blocks to the printing machine, and then passing them between two printing elements whereby impressions are made on two opposite sides of the blocks simultaneously. While I prefer, as a matter of economy in manufacturing, to eliminate the sharp, square, longitudinal or straightgrained edges of the blocks during said preliminary operations, it will be obvious that these edges may also be eliminated by the method mentioned by passing the blocks through an additional set of rollers.

The invention contemplates printing the six sides of the blocks in three printing operations, the blocks preferably being passed successively through three sets of printing element or wheels. This is accomplished preferably by passing the blocks through three sets of printing wheels, there being three sets of printing wheels to each set, arranged in two of such wheels and turning the blocks one a vertical plane and turning the blocks one quarter over in passing them from one of these sets to another, or by passing them through three sets of printing wheels, one set being arranged in a plane at right angles to the plane of the other two sets. The invention also contemplates embossing the transverse or edge grained sides of the blocks as they are passed through the printing machine, these sides being the only sides which can be successfully embossed without the application of heat. It is important, therefore, that the blocks be passed through the apparatus so that the edge grain of each block will be subjected to the embossing operation.

Preferably the blocks are made up in sets of a certain number of blocks to a set and passed through the various steps mentioned at a constant rate per unit of time each printing or embossing wheel carrying the same number of dies as there are blocks in a set. It is essential, therefore, that the "block" machine, which is the term I have applied to the machine for eliminating the sharp corners and edges on the blocks, and the printing machine be operated in synchronism. The speed of one machine is coordinated with that of the other, both machines being driven from the same source of power whereby only as many blocks will be delivered to the printing machine as that machine is equipped to handle. If sets of blocks of a lesser number to a set are desired, they may be obtained by reducing the number of dies on the printing and embossing wheels and increasing the speed of the printing machine, or reducing the rate at which the blocks are passed through the block machine and conveyed to the printing machine.

Another object of the invention is to provide novel apparatus for carrying out the various steps of the method of manufacturing and printing the blocks, herein before mentioned whereby large quantities of the finished blocks may be turned out with a minimum amount of labor, the blocks being fed to the block machine manually, no other handling thereof by hand being required.

Another object of the invention is to provide novel means for conveying the blocks from the block machine to the printing machine, and through the printing machine between the various sets of printing wheels. The latter step is accomplished either by carrying the blocks between the printing wheels on suitable conveyors, or by providing certain sliding elements in the peripheries of certain of the printing wheels which operate by a cam arrangement to pick up the blocks one by one, and carry them through between the dies on the wheels, the blocks being delivered by means of a chute from one set of wheels to another, one of said chutes having a spiral passageway adapted to turn the blocks one quarter over as they pass through it.

Another object of the invention is to provide in combination with the apparatus for printing two opposite sides of a block simultaneously, means whereby the printing wheels of a set may be adjusted relatively with respect to each other to accommodate blocks of various size and whereby the dies of one wheel may be aligned, either collectively or individually, with those on the other wheel.

The invention consists in the novel method to be hereinafter described and claimed, for eliminating the sharp corners and edges on the blocks, and for printing or embossing two opposite sides of the blocks simultaneously. The invention consists further in the novel constructions, arrangements and devices, to be hereinafter described and claimed, for carrying out the above stated objects and such other objects as will appear from the following description of certain preferred embodiments illustrated in the accompanying drawings, wherein:

Fig. 1 is a side elevation of the printing machine;

Fig. 2 is a side elevation, certain parts being shown in section, of the block machine, the means employed for conveying the blocks to the printing machine, and the means for driving the two machines;

Fig. 3 is a sectional view of the conveying means;

Fig. 4 is a transverse sectional view taken on the line 4—4 of Fig. 1, a part of the lower portion of the section being taken on a line offset to show the driving mechanism for the lower printing wheel;

Fig. 5 is a longitudinal sectional view of the printing machine, illustrating the driving mechanism and the means for adjusting vertically the respective upper printing wheels relatively with respect to the lower wheels;

Fig. 6 is a side elevation, partly in section, of a fragmentary portion of one of the lower printing wheels, illustrating the cam arrangement and sliding elements operated thereby for carrying the blocks between the printing wheels;

Fig. 7 is a sectional view taken on the distorted line 7—7 of Fig. 6;

Fig. 8 is a perspective view of one of the sliding elements and fingers carried by the lower printing wheels;

Fig. 9 is a detail plan view of one of the dies attached to the printing wheels;

Fig. 10 is an end elevational view of the block machine;

Fig. 11 is a detail view of the dies for rounding the corners on the blocks;

Fig. 12 is a perspective view of one of the dies shown in Fig. 11;

Fig. 13 is an elevational view of one of the dies;

Fig. 14 is an elevational view, partly in section, of one set of rollers of the block machine for rounding the edges of the blocks;

Fig. 15 is a sectional view, taken on the line 15—15 of Fig. 14;

Fig. 16 is a view showing a modified arrangement for driving the block and printing machines;

Fig. 17 is a perspective view of a block after passing through the preliminary planing and sawing operations;

Fig. 18 is a perspective view of a block after passing through the first set of rollers of the block machine showing four of the transverse edges rounded;

Fig. 19 is a perspective view of a block after passing through the second set of rollers, showing the remaining four transverse edges rounded;

Fig. 20 is a perspective view of the block after passing through the dies for rounding the corners thereof;

Fig. 21 is a longitudinal sectional view of the printing machine showing a modified form of driving mechanism and means for adjusting vertically the respective upper printing wheels relatively with respect to the lower wheels;

Fig. 22 is a side elevational view of a modified form of printing machine, one set of printing wheels being in a plane at right angles to the plane of the other two sets, and modified means for conveying the blocks through the printing machine;

Fig. 23 is a plan view of one of the dies and a fragmentary portion of the conveying mechanism shown in Fig. 22; and Fig. 24 is a sectional view taken on the line 24—24 of Fig. 23.

Like characters of reference designate like parts in the several figures.

After the blocks have been preliminarily operated upon as hereinbefore described, they are fed by hand into the block machine and the sharp corners and edges eliminated by passing the blocks successively, by certain reciprocating members, through sets of rollers and dies whereby the sharp square edges and corners are compressed and rounded. The blocks are forced out of the block machine onto a conveyor and delivered to the printing machine. They are carried through the printing machine by suitable means being passed successively between three sets of printing wheels each set comprising two wheels and adapted to print opposite sides of the blocks simultaneously. I will describe first the apparatus for eliminating the sharp, square corners and edges of the blocks which I have termed generally as the block machine.

This machine is illustrated in Figs. 2 and 10 to 15 inclusive. The blocks are inspected and placed by hand on a conveyor belt 30, care being taken to place the blocks so that the grain thereof runs transversely of the belt, which delivers them into a vertical chute 31 through which they drop by gravity into the path of a horizontally arranged plunger 32 operated by a reciprocating member 33. The blocks are pushed by the plunger 32 one by one through the set of rollers designated generally by the reference numeral 34. The blocks are forced out of the rollers 34 into the path of a vertically arranged plunger 35 operated by a reciprocating member 36. The plunger 35 forces the blocks one by one through a second set of rollers designated generally by the reference numeral 37 into a passageway 38 where they pass by gravity into the path of another horizontally arranged plunger 39 which is secured to the reciprocating member 33. The plunger 39 forces the blocks, one by one, into position between the dies 40 which are operated by a toggle arrangement designated generally by the reference numeral 41. The blocks are forced out of the dies 40 onto a conveyor 42 which delivers them to the printing machine.

The drive shaft 43 of the block machine is operatively connected by suitable transmission gears hereinafter referred to, to the drive shaft 44 of the printing machine. A power wheel 45 is secured to a shaft 46 which is driven by spiral gears 47 and 48 from shaft 43. The reciprocating members 33 and 36 are connected to the power wheel 45 by the respective connecting links 49 and 50. A walking beam 51 is pivoted at 52 to a framework 53. The walking beam is connected by a link 54 to the reciprocating member 36 and by a link 55 to the toggle arrangement 41. The arms 56 of the toggle are pivoted at 57 to a stationary part 58, and are each provided with a tooth 59 which meshes, respectively, with the teeth 60 of the sliding members 61. The dies 40 are secured to the sliding members 61 by means of screws 62, these dies being adapted to compress and round the eight corners of the blocks.

The roller sets 34 and 35 each comprise two pairs of rollers 63 which are mounted upon bolts 64 secured in parallel arrangement to a frame 65 which is secured to the frame of the block machine in any desired way. The rollers the provided with horizontal portions 66, adapted to bear upon the top and bottom of a block, and with flange portions 67 adapted to bear against opposite sides of the block, the corners between the horizontal and flanged portions of each roller being rounded and adapted to eliminate the sharp square edges of a block by compressing and rounding the same.

In Fig. 17 I have shown a block as it is fed to the block machine, the four longitudinal or straight grain edges $a$, $a$, having been eliminated by the preliminary planing operation. In Fig. 18 I have shown a block after it has been passed through the first set of rollers, the four horizontal, sharp, transverse edges $b$, $b$, having been eliminated. In Fig. 19 I have shown a block after it has been passed through the second set of rollers, the remaining or four vertical, sharp, transverse edges $c$, $c$ having been eliminated. In Fig. 20 I have shown a block after it has been subjected to the action of the dies, the four corners $d$, $d$ having been further compressed and rounded.

The conveyor 42 (Fig. 3) comprises a trough, consisting of two angle irons 68 which are turned so that their horizontal flanges form the bottom of the trough and the vertical flanges form the sides thereof, and an endless chain which runs over sprocket wheels 69 and 70, mounted, respectively, on the block and printing machines. The sprocket wheel 69 is mounted on a countershaft 71 which is driven from the shaft 46 by a chain 72. The conveyor chain is provided with a plurality of fingers 73 which are adapted to pick the blocks up one by one as they are delivered to the conveyor by the block machine.

*The printing machine.*

Referring now to Figs. 1 and 4 to 9 inclusive it will be seen that the printing machine illustrated in these views is of the vertical type. The machine comprises six printing wheels arranged in three sets. Each set comprises a lower printing wheel 80 and an upper printing wheel 81 in vertical alignment therewith. The lower printing wheels are mounted on transverse shafts 82 which are supported in suitable bearings formed in the side frames 83. The upper printing wheels are mounted on transverse shafts 84 supported in vertically adjustable bearings 85 which are mounted in the supports 86 integrally formed with or secured to the frame members 83. The bearings 85 may be moved vertically in the supports 86 by turning the adjusting screws 87.

In the form shown in these views the shafts 82 and 84 are driven by worms 88 and 89, respectively, meshing with the spiral gears 90 and 91 keyed to the shafts. The worms 88 and 89 are secured to a vertical shaft 92 provided with a bevel gear 93 which meshes with gear 94 secured to the driving shaft 44. The worms 88 and 89 are right and left handed and drive the printing wheels in the direction indicated by the arrows thereon (Fig. 1). The worms and associated gears are enclosed in suitable housings 95 which may be supported in any desired way, for example, by the brackets 96 secured to cross arms 97 attached to the frame. The shaft 92 is made in two parts the adjacent ends being square in cross-section and slidingly fitting into a sleeve 98 to which arrangement permits the shaft 84 to be moved vertically with respect to the shaft 82.

The six printing wheels are identical in construction except the lower wheels, which are provided with certain additional features hereinafter noted. Each wheel comprises a flanged member 99, keyed to its respective shaft, which supports a slip ring 100 to which the ring 101, carrying the printing dies, is secured. The ring 100 seats against a shoulder 102 formed on the flange 99 and is adapted to be adjusted relatively thereto so as to permit aligning the dies collectively with the dies on the opposite wheel of the set. The member 99 is formed with a pair of upstanding lugs 103 between which the lug 104 carried by the slip ring 100 projects, the lugs 103 forming bearings for the adjusting screws 105. By loosening the set screws 106 the slip ring 100 may be moved relatively by turning the adjusting screws 105.

The die carrying ring 101 is secured to the slip ring by screws 107. The peripheral face of the die carrying ring is provided with a plurality of recesses 108 adapted to receive the printing dies 109 which are secured thereto by the clamping plates 110 and set screws 111. A pair of upstanding lugs 112 formed on the ring 101 provide bearings for the adjusting screws 113 which are adapted to bear against the die 109, thereby providing means whereby the dies may be aligned individually and also forming stops to prevent the dies from creeping backwardly during the printing operation.

If desired the ring 100 may be formed integrally with the flanged member 99. If such a construction be employed I provide means for adjusting the dies collectively on the upper printing wheels relatively to those on the lower printing wheels, (Fig. 5). This adjustment may be obtained by moving the worm 89 vertically in its housing 95 by manipulating the adjusting nuts 114, vertical movement of the worm 89 resulting in the upper printing wheel being turned relatively to the lower printing wheel.

Suitable inking mechanisms 115 (Fig. 1) are provided for applying ink to the dies on the respective wheels, each mechanism being driven by a chain 116 running over a wheel secured to the shaft of the associated printing wheel as is well known in the art of printing.

In Fig. 1 I have shown means whereby the blocks are delivered to each set of printing wheels picked up by means associated with the lower wheel of each set and carried through between the upper and lower wheels, the blocks being turned one quarter over in passing from one to another set of wheels. In the lower printing wheels just behind each die is provided a block 117 (Fig. 6) which is adapted to slide in and out of a radial slot 118 formed in the rings 100 and 101. Each block is provided with a roller 119 which engages a cam 120 formed in a member 121 secured to the frame member 83. The general outline of the cam 120 is indicated in dotted lines on the lower printing wheel of the last set (Fig. 1). Each of the blocks 117 supports a resilient finger 122 secured to the head of a stud 123 which is threaded into the block 117. The blocks are deposited in a chute 124 by the conveyor 42 through which they pass to the lower printing wheel of the first set and as the printing wheels rotate in the direction indicated by the arrows in Fig. 1 the fingers 122, carried by the blocks 117, are forced outwardly by the cam arrangement and pick up the blocks one by one carrying the blocks through between the two printing wheels. After passing between the first set of wheels the blocks descend by gravity to the second set of wheels through a spiral chute 125 thereby being turned one quarter over. They are picked up by the fingers of the lower printing wheel of the second set and carried between the printing wheels of the second set and then passed by gravity to the last set of wheels through a straight chute 126 where they are picked up by the fingers of the lower printing wheel and carried between the wheels of the last set which completes the printing operation. They are delivered to a table 127 where they may be boxed for shipment. The blocks are held in proper alignment while passing through between the printing wheels by guide members 128 (Fig. 4) which connect the chute on one side of the wheels with that on the other. The resilient fingers 122 are stiff enough to hold the blocks in alignment until they are caught between the dies.

The printing machine is driven by a tight and loose pulley arrangement 129, (Fig. 5)

mounted on shaft 44 power being transmitted to the block machine by means of suitable variable speed gears 130, (Fig. 2) as is well known in the art. The belt may be shifted from the tight to the loose pulley, or vice versa, by movement of the lever 131. If desired means may be provided for shutting off the power if the blocks stick in passing through the chutes of the printing machine. For this purpose an electromagnet 132 may be provided which is connected to the contact points 133 arranged on the printing machine. The chutes 124, 125 and 126 are provided with certain hinged sections whereby, if a block sticks in a chute, one of the hinged sections will be forced into contact with its associated contact point 133 thereby completing the electromagnet circuit. The armature of the electromagnet is provided with a pawl 134 which engages a horizontally sliding member 135 provided with arms 136 for shifting the belt to the loose pulley which movement is assisted by a tension spring 137.

If desired the power may be applied to the shaft 46 of the block machine and by a similar arrangement of gears transmitted to the shaft 44 of the printing machine. (Fig. 16). With this arrangement the speed of the block machine is constant and the speed of the printing machine is varied.

Operation: The blocks are turned out in sets of a certain number to a set. Assuming that it is desired to turn out blocks in sets of 24 to a set, each printing wheel will be provided with 24 dies and assuming also that the printing wheels have a speed of six revolutions per minute the printing machine will turn out six sets of blocks, 24 to a set, per minute. It is essential that the block and printing machines operate in synchronism and that the block machine be operated so as to produce and deliver to the printing machine the same number of blocks per minute. This is accomplished by shifting the gears 130 and operating the block machine at a speed which will produce and deliver the required number of blocks per minute.

If it is desired to turn out the blocks in sets of a lesser number to a set, for example, 20 blocks to a set, four of the dies are removed from each printing wheel, the associated fingers 122 also being removed from the lower wheels. The speed of the block machine may be reduced to deliver only as many blocks as are required by the printing machine or the speed of the printing machine increased to take care of the blocks delivered by the block machine. In this way the operation of the two machines is coordinated.

The blocks are placed on the belt 30 with the edge of the grain running transversely of the belt. When they are forced through the first set of rollers the four horizontal transverse edges are compressed and rounded. In passing through the second set of rollers the four transverse vertical edges are compressed and rounded. When subjected to the action of the dies 40 the corners are further compressed and rounded. The blocks are delivered, as forced out of the block machine, by the conveyor 42 to the printing machine being delivered into the chute 124 from which they are picked up by the fingers of the lower printing wheel and carried through the first set of printing wheels, two sides being printed simultaneously. They pass by gravity through the spiral chute 125 thereby being turned one quarter over, and are picked up by the fingers of the lower printing wheel and carried through the second set of printing wheels and two more sides printed simultaneously. They then pass by gravity through the chute 126 to the last set of printing wheels and are picked up by the fingers of the lower wheel and carried through between the wheels, and the remaining two sides printed simultaneously. The guide plates 128 prevent lateral movement of the blocks and the fingers 122 in cooperation with the plates 128 hold the blocks until they are caught between the two dies. When the blocks are thus fed into and passed through the block and printing machine it will be noted that the impression is made on the edge grain of the block in passing through the last set of printing wheels. These wheels preferably carry embossing dies. When certain sides of the block are embossed it is important that the blocks be passed through the block machine in a certain relation to the embossing dies so that the proper surface will be presented for the embossing operation.

If one of the printing dies gets out of alignment it may be placed in alignment by adjusting the screws 113. If all the dies on one wheel are out of alignment with those on the opposite wheel they may be brought into alignment by adjusting the slip ring 100 relatively to the member 99.

If blocks of a different size are to be handled the rollers 63 of the block machine are removed and rollers of the proper size substituted. The upper printing wheels are adjusted vertically by turning the adjusting screws 87. The dies on the upper wheels may be brought into alignment with those on the lower wheel either by adjusting the slip ring 100 relatively to the member 99 or by adjusting the worm 89 vertically by turning the adjusting nuts 114.

In Fig. 21 I have shown a modified form of mechanism for driving the printing wheels. The shaft 82 is provided with a spiral gear 138 which meshes with a worm 139 carried by the drive shaft 44. The lower printing wheels are driven from the shaft 82 by a train of gears 140 to 145 inclusive. The upper printing wheels are driven by gears 146, 147 and 148 driven by the idlers 149, 150 and 151 meshing with the gears 141, 143 and 145 respectively. As shown in the drawings these gears are provided with epicycloidal teeth, which teeth permit vertical adjustment of the upper printing wheels, within certain limits, without the gears getting out of mesh, such vertical adjustment being obtained by turning the nuts 152 on the threaded studs 153 which secure the bearings 154 for the shafts 84 against relative movement.

In Fig. 22 I have shown a modified arrangement of the printing wheels, one set being arranged in a plane at right angles to the plane of the other two sets. In this figure I have also shown modified means for conveying the blocks through the printing machine.

The first and last sets of printing wheels are driven by the shaft 44 by mechanism similar to that illustrated in Fig. 5.

The horizontal set of printing wheels are driven by a train of gears 155, 156 and 157, the latter meshing with a bevel gear 158 on the shaft 82. The printing wheels may be adjusted relatively to each other in the manner heretofore described. In this form of apparatus the blocks are carried through the three sets of printing wheels by suitable chain conveyors. The blocks are picked up as delivered by the block machine by a conveyor 159 driven by the lower printing wheel of the first set and operating over an idler 160. The conveyor 159 deposits the blocks into a chute 161 from which they are picked up by a conveyor 162 driven by the lower printing wheel of the last set. The conveyors 159 and 162 are similar in construction to the conveyor 42. The blocks are picked up and carried along in the conveyors 159 and 162 by the vertical resilient fingers 163 carried by the transverse bars 164 of the conveyor chains. Since one set of printing wheels is in a plane at right angles to the plane of the other two sets it is not necessary to give the blocks a one quarter turn as they are passed through the machine. The machine may be operatively connected with the block machine in the manner hereinbefore described. The operation of the two machines, however, is coordinated so that the required number of blocks are delivered by the block machine to the printing machine.

The printing machine may be equipped to turn out blocks in sets, for example, of 24 to a set. When it is desired to turn out sets of a lesser number of blocks the required number of dies may be removed from each printing wheel and certain of the fingers 163 removed from the conveyors 159 and 162, the relative speeds of the block and printing machines being coordinated as hereinbefore described.

It will be observed from Figures 18 and 19 that the corners of the block are partially rounded by the rollers 63. The dies 40 are not, therefore, essential to the elimination of the sharp corners but may be employed when it is desired to round the corners to a greater extent as shown in Figure 20.

The word "printing" is used in certain of the appended claims in its broad and general sense and as so used includes making an impression of an object by embossing. Where, however, the word appears in certain of the claims in connection with the words "embossed" or "embossing" it is to be understood as to such claims the word is used in its restricted sense to cover making an impression without indenting the blocks.

Certain modifications have been described herein. It will be obvious that further modifications of various kinds may be made in the constructions, arrangements and devices without departing from the principles of my invention. I do not limit the invention, therefore, to the constructions, arrangements and devices herein described, except only in so far as certain of the appended claims are specifically so limited.

I claim:

1. The method of printing play blocks which consists first in printing one face, then giving the block a quarter turn, then printing a second face, then giving the block a quarter turn at right angles with respect to the direction of the first quarter turn, and then printing a third face.

2. Apparatus for manufacturing and printing blocks of the class described comprising a plurality of rollers arranged in pairs, each pair being adapted to bear on the edges of the blocks as the blocks are passed between them whereby the edges are rounded, means to convey the blocks between the rollers, a pair of printing elements arranged to bear on opposite sides as the blocks are passed between them, and means adapted to carry the blocks from said rollers to and between said printing elements, whereby two sides of the blocks are printed simultaneously.

3. Apparatus for manufacturing and printing blocks of the class described comprising a plurality of rollers arranged in pairs, each pair being adapted to bear on the edges of the blocks as the blocks are passed between them, whereby the edges are rounded, means to convey the blocks between the rollers, a plurality of printing elements arranged in pairs, each pair arranged to bear on opposite sides of the blocks as the blocks are passed between them and means adapted to carry the blocks from said rollers to and between said printing elements, whereby two sides of the blocks are printed simultaneously by each pair of elements.

4. Apparatus for manufacturing and printing blocks of the class described comprising a plurality of rollers arranged in pairs, each pair being adapted to bear on the edges of the blocks as the blocks are passed between them, whereby the edges are rounded, means to convey the blocks between the rollers, a pair of printing wheels arranged to bear on opposite sides as the blocks are passed between them, and means adapted to carry the blocks from said rollers to and between said printing wheels, whereby two sides of the blocks are printed simultaneously.

5. Apparatus for manufacturing and printing blocks of the class described comprising a plurality of rollers arranged in pairs, each pair being adapted to bear on the edges of the blocks as the blocks are passed between them, whereby the edges are rounded, means to convey the blocks between the rollers, a pair of printing wheels arranged in a vertical plane, one above the other and adapted to bear on opposite sides of the blocks as the blocks are passed between them, and means adapted to carry the blocks from said rollers to and between said printing wheels, whereby two sides of the block are printed simultaneously.

6. Apparatus for manufacturing and printing blocks of the class described comprising a plurality of rollers arranged in pairs, each pair being adapted to bear on the edges of the blocks as the blocks are passed between them, whereby the edges are rounded, means to convey the blocks between the rollers, a plurality of printing wheels arranged in pairs, each pair arranged to bear on opposite sides of the blocks as the blocks are passed between them and means adapted to carry the blocks from said rollers to and between said printing wheels, whereby two sides of the blocks are printed simultaneously by each pair of wheels.

7. Apparatus for manufacturing and printing blocks of the class described comprising a plurality of rollers arranged in pairs, each pair being adapted to bear on the edges of the blocks as the blocks are passed between them, whereby the edges are rounded, means to convey the blocks between the rollers, a plurality of printing wheels arranged in a vertical plane in pairs- each pair arranged to bear on opposite sides of the blocks as the blocks are passed between them and means adapted to carry the blocks from said rollers to and between said printing wheels, whereby two sides of the blocks are printed simultaneously by each pair of wheels.

8. Apparatus for manufacturing and printing blocks of the class described comprising a plurality of rollers arranged in pairs, each pair being adapted to bear on the edges of the blocks as the blocks are passed between them whereby the edges are rounded, means to convey the blocks between the rollers, six printing wheels arranged in pairs, each pair arranged to bear on opposite sides of the blocks as the blocks are passed between them, and means adapted to carry the blocks from said rollers to and between said printing wheels.

9. Apparatus for manufacturing and printing blocks of the class described comprising a plurality of rollers arranged in pairs, each pair being adapted to bear on the edges of the blocks as the blocks are passed between them whereby the edges are rounded, means to convey the blocks between the rollers, six printing wheels arranged in a vertical plane in pairs, each pair arranged to bear on opposite sides of the blocks as the blocks pass between them, means adapted to carry the blocks from said rollers to and between said printing wheels, and means adapted to turn the blocks one quarter over in carrying them from one pair to another pair of said wheels, whereby the six sides of each block are printed by said wheels.

10. Apparatus for manufacturing and printing blocks of the class described comprising a plurality of rollers arranged in pairs, each pair being adapted to bear on the edges of the blocks as the blocks are passed between them, means to convey the blocks between the rollers, a pair of printing elements arranged to bear on opposite sides of the blocks as the blocks are passed between them, means to operate said printing elements, and means adapted to carry the blocks from said rollers to and between said printing elements, whereby two sides of the blocks are printed simultaneously, said conveying and carrying means being operated in synchronism with said printing elements.

11. Apparatus for manufacturing and printing blocks of the class described comprising a plurality of rollers arranged in pairs, each pair being adapted to bear on the edges of the blocks as the blocks are passed between them, means to convey the blocks between the rollers, a pair of printing wheels arranged to bear on opposite sides of the blocks as the blocks are passed between them, means to operate said printing wheels, and means adapted to carry the blocks from said rollers to and between said printing wheels, whereby two sides of the blocks are printed simultaneously, said conveying and carrying means being operated in synchronism with said printing wheels.

12. Apparatus for manufacturing and printing blocks of the class described comprising a plurality of rollers arranged in pairs, each pair being adapted to bear on the edges of the blocks as the blocks are passed between them, means to convey the blocks between the rollers, a plurality of printing elements arranged in pairs, each pair adapted to bear on opposite sides of the block as the blocks are passed between them, and means adapted to carry the blocks from said rollers to and between said printing elements, whereby two sides of the blocks are printed simultaneously, the number of blocks per unit of time handled by said conveying and carrying means being coordinated with the operation of said printing elements.

13. Apparatus for manufacturing and printing blocks of the class described comprising a machine provided with a plurality of rollers arranged in pairs, each pair being adapted to bear on the edges of the blocks as the blocks are passed between them, means to convey the blocks between the rollers, a printing machine provided with a plurality of printing elements arranged in pairs, each pair adapted to bear on opposite sides of the blocks as the blocks are passed between them, means adapted to carry the blocks from said rollers to and between said printing elements, one of said machines being connected to a source of power and means to drive the other machine from said power driven machine.

14. Apparatus for manufacturing and printing blocks of the class described comprising a machine provided with a plurality of rollers arranged in pairs, each pair being adapted to bear on the edges of the blocks as the blocks are passed between them, means to convey the blocks between the rollers, a printing machine provided with a plurality of printing elements arranged in pairs, each pair adapted to bear on opposite sides of the blocks as the blocks are passed between them, means adapted to carry the blocks from said rollers to and between said printing element, one of said machines being connected to a source of power and means to drive the other machine from said power driven machine, and in synchronism therewith.

15. Apparatus for manufacturing and printing blocks of the class described comprising a machine provided with a plurality of rollers arranged in pairs, each pair being adapted to bear on the edges of the blocks as the blocks are passed between them, means to convey the blocks between the rollers, a printing machine provided with a plurality of printing elements arranged in pairs, each pair adapted to bear on opposite sides of the blocks as the blocks are passed between them, means adapted to carry the blocks from said rollers to and between said printing elements, said printing machine being connected to a source of power, and means to drive the other machine from said power driven machine.

16. Apparatus for manufacturing and printing blocks of the class described in sets of a certain number to a set comprising a plurality of rollers arranged in pairs, each pair being adapted to bear on the edges of the blocks as they are passed therebetween, means to convey the blocks between the rollers, a pair of printing wheels, printing dies on said wheels arranged to bear on opposite sides of the blocks as they are passed therebetween, there being the same number of dies on said wheels as blocks in a set, means to operate said wheels, and means adapted to convey the blocks from said rollers to and between said wheels, said conveying and carrying means being operated in coordination with said wheels.

17. Apparatus for manufacturing and printing blocks of the class described in sets of a certain number to a set comprising a machine provided with a plurality of rollers arranged in pairs, each pair being adapted to bear on the edges of the blocks as they are passed therebetween, means to convey the blocks between the rollers, a printing machine having a plurality of wheels arranged in pairs, printing dies on said wheels, there being as many dies on the wheels as blocks in a set whereby opposite sides of the blocks are printed simultaneously as they are passed therebetween, means to convey the blocks therethrough, means to convey the blocks from one machine to the other, and means to drive said machines, the speed of the printing machine being constant and the speed of the first mentioned machine being varied according to the number of blocks to a set and dies on the wheels.

18. Apparatus for printing blocks of the class described comprising six printing wheels arranged in a vertical plane in pairs, each pair arranged to bear on opposite sides of the blocks as the blocks are passed between them, means adapted to carry the blocks through therebetween, and means adapted to turn the blocks one quarter over in carrying them from one pair to another pair of said wheels.

19. Apparatus for printing blocks of the class described, comprising a pair of wheels, die-carrying rings mounted on said wheels, dies on said rings, said wheels being arranged so that the dies bear on opposite sides of the blocks as they are passed therethrough, and means for driving said wheels, said rings being adjustable on said wheels whereby the dies on one wheel may be collectively brought into alignment with those on the other wheel, said dies being each individually adjustable on said rings.

20. Apparatus for printing blocks of the class described comprising six printing wheels arranged in pairs in a vertical plane, one wheel of each pair above the other, chutes for conveying the blocks from one pair of wheels to the other, and means associated with one wheel of each pair for picking the blocks up from the chutes and carrying them between the printing wheels, one of said chutes carrying a spiral passageway whereby the blocks are turned one quarter over as they pass therethrough.

SAMUEL G. GOSS.